(12) United States Patent
Perera et al.

(10) Patent No.: US 7,351,774 B2
(45) Date of Patent: Apr. 1, 2008

(54) SILICON-MODIFIED CRUMB RUBBER COMPOSITION

(75) Inventors: K. Prasanna U. Perera, Clemson, SC (US); Dennis W. Smith, Jr., Seneca, SC (US); J. Cal Moreland, Greer, SC (US); Kevin Wallace, Simpsonville, SC (US)

(73) Assignee: Michelin Recherche et Technique S.A., Granges-Paccot (CH)

( * ) Notice: Subject to any disclaimer, the term of this patent is extended or adjusted under 35 U.S.C. 154(b) by 46 days.

(21) Appl. No.: 11/227,335

(22) Filed: Sep. 15, 2005

(65) Prior Publication Data

US 2007/0060711 A1    Mar. 15, 2007

(51) Int. Cl.
*C08G 77/382*    (2006.01)
*C08L 83/00*    (2006.01)

(52) U.S. Cl. .................. 525/478; 525/88; 525/98; 525/99; 525/92 R; 525/100; 525/105; 525/326.1

(58) Field of Classification Search .................. 525/88, 525/98, 99, 92 R, 101, 105, 326.1, 478
See application file for complete search history.

(56) References Cited

U.S. PATENT DOCUMENTS

| | | | |
|---|---|---|---|
| 2,637,738 A | 5/1953 | Wagner | |
| 2,823,218 A | 2/1958 | Speier | |
| 3,159,662 A * | 12/1964 | Ashby | 528/15 |
| 5,051,224 A | 9/1991 | Donatelli | |
| 5,359,111 A * | 10/1994 | Kleyer et al. | 556/479 |
| 5,672,660 A | 9/1997 | Medsker | |
| 2004/0030053 A1* | 2/2004 | Izumoto et al. | 525/326.1 |
| 2004/0151933 A1 | 8/2004 | Ajabani et al. | |
| 2005/0148727 A1 | 7/2005 | Ajabani et al. | |

OTHER PUBLICATIONS

Marvin Myhre et al; "Rubber Recycling"; Rubber Chemistry and Technology, vol. 75, pp. 429-469.
Siegfried Wolff: Chemical Aspects of Rubber Reinforcement; Rubber Chemistry and Technology, vol. 69, pp. 328-344.
Gerald Holland et al; Particle Size Analysis For Granulated Rubber; Rubber and Plastics News, Oct. 12, 1992.
PCT Search Report and Written Opinion, Feb. 1, 2007 PCT/US2006/035818.

* cited by examiner

*Primary Examiner*—Ling-Sui Choi
(74) *Attorney, Agent, or Firm*—Alan A. Csontos; Frank J. Campigotto; E. Martin Remick

(57) ABSTRACT

The present invention relates to a modified crumb rubber particle having carbon to silicon bonds created by the reaction of the unsaturation in the crumb rubber particle and silicon hydride, with or without the use of a catalyst. Bound silicon content ranges from about 0.1% to 10% by weight. The silicon-modified crumb rubber can be used as is or a reinforcing filler in formulations. Typically the silicon-modified crumb rubber is used in up to 25% by weight of the total rubber present in virgin rubber compositions.

11 Claims, 4 Drawing Sheets

SILICON-MODIFIED CRUMB RUBBER COMPOSITION

FIELD OF THE INVENTION

The present invention is in the field of recycling of tires and, more particularly, in the use of crumb rubber obtained from scrap tires.

BACKGROUND OF THE INVENTION AND PRIOR ART

Hundreds of millions of tires are scrapped each year due to wear or damage. Presently, the United States alone generates approximately 270,000,000 scrap tires per year. About twenty-six percent of scrap tires each year end up in landfills and stockpiles, and in only about ten percent of the time the rubber is recovered and re-used. In total, scrap tire inventories are estimated to be between 2 and 3 billion tires.

Efforts have been made to find uses for scrap tires to minimize the inventories. Some of the uses for the scrap whole tires include artificial fishing reefs, floating breakwaters, and impact absorbers around highway and bridge abutments. Whole or cut up portions of scrap tires are also used in playgrounds, flower planters, shoe soles and dock bumpers. Whole tires and shredded tire chips may also be burned and used as fuel. Reclaimed tire rubber or crumb rubber can also be used to make low value rubber products such as floor mats and in asphalt for roadways.

Currently, only low amounts of recycled rubber such as tire rubber, in the form of vulcanized or crosslinked crumb rubber particles, are used in tires (typically less than about 10% by weight of the rubber in the tire). The reason for the low level of usage is that the addition of crumb rubber in virgin rubber compounds lowers important functional properties in the tire such as high strain modulus and tensile strength.

Therefore, the development of a crumb rubber that can be used in levels above 10% in a virgin rubber tire compound without significantly degrading the properties of a tire would be desirable.

An excellent summary of the status of tire and rubber recycling, rubber reclaiming technologies and processes, methods to obtain "crumb rubber" and technologies to treat or modify crumb rubber to make it more usable in formations is given in the article "Rubber Recycling", *Rubber Chemistry and Technology*, Vol. 75, pages 429-469, by Marvin Myhre and Duncan A. MacKillop.

More recently, recycling efforts have focused on treating or modifying crumb rubber particles to make it more dispersible and cure compatible with other ingredients in formulations. This is the direction of the present invention.

The invention comprises the modification of crumb rubber through the reaction between crumb rubber and a Silicon hydride to form carbon-silicon bonds. The crumb rubber so modified can be used at higher levels in virgin rubber formulations without significantly degrading important properties.

The chemistry of reacting silicon hydride with >C=C< unsaturation (or carbon-carbon double bonds) is known. U.S. Pat. Nos. 2,637,738; 2,823,218; and 3,159,662 disclose the reaction of silicon hydrides having an active hydrogen site with unsaturated molecules and compounds to produce new compounds having a carbon-silicon bond. The unsaturated compound can be a low molecular weight compound or a polymer such as an uncured or uncrosslinked rubber. The reaction is typically catalyzed using a platinum catalyst such as commercial Speir's catalyst (chloroplatinic acid) or Karsted's catalyst (Pt zero complex with divinyltetramethyl disiloxane). This is done because the uncatalyzed reaction is described to be slow, unless conducted at relatively high temperatures, and inefficient with low yields of desired product and production of many unwanted by-products.

A platinum-catalyzed hydrosilation crosslinking reaction is described in U.S. Pat. No. 5,672,660. Here, an uncured diene-containing elastomer is reacted with a Silicon hydride in the presence of a thermoplastic resin and a platinum catalyst to prepare a thermoplastic elastomer.

More recently, US Publication No. US 2004/0030053 A1 (Feb. 12, 2004) shows the preparation of a surface-modified rubber useful as a recycled material. This material is prepared by the reaction of a waste (crumb) rubber with a silane-coupling agent having a mercapto group or an S—S bond. This reaction forms a sulfur-carbon (S—C) bond and not a silicon-carbon (Si—C) bond, as described in Volume 69, page 325 Rubber Chemistry and Technology, 1996 by Siegfried Wolff entitled Chemical Aspects of Rubber Reinforcement by fillers (see pages 328-344).

SUMMARY OF THE INVENTION

Applicants applied hydrosilation of alkene chemistry to modify vulcanized and crosslinked crumb rubber particles and discovered that the reaction between their Silicon hydride compounds and the vulcanized crumb rubber proceeded effectively and efficiently, with and without the use of an added catalyst, to produce a modified crumb rubber having a high level of carbon-silicon (C—Si) bonds. Applicants further discovered that their silicon-modified crumb rubber could be used at higher levels in virgin rubber formulations without significantly degrading important properties as much as the untreated crumb rubber. The crumb rubber particle preferably has about 0.1% to about 10% by weight of the rubber of bound silicon present as carbon-silicon (C—Si) bonds. The carbon to silicon bond was created by the reaction of the crumb rubber particle and silicon hydride.

DETAILED DESCRIPTION OF THE INVENTION

Figure 1:
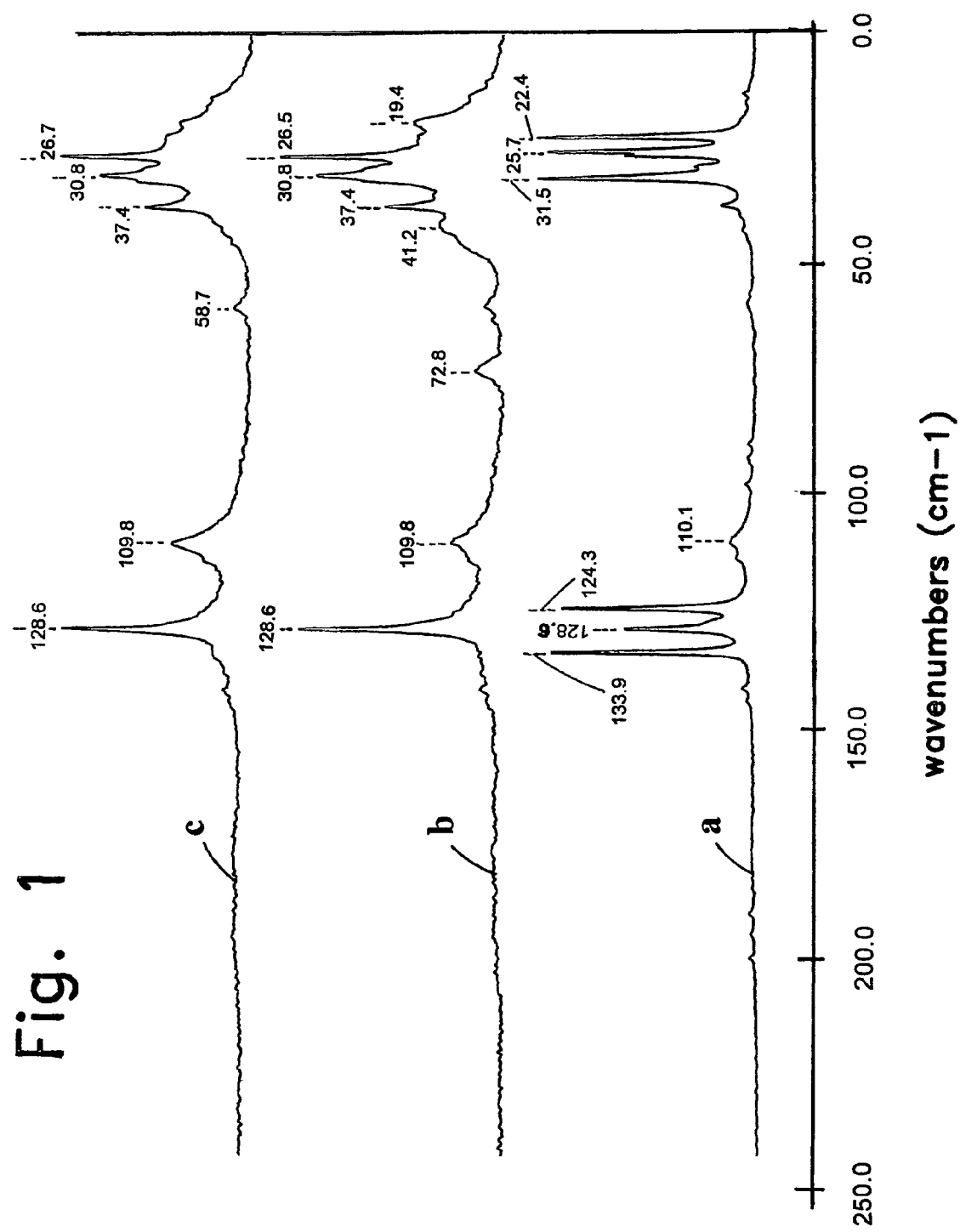
FIG. 1: $^{13}$C NMR (DP MAS), spectra overlay of (a) unreacted crumb tire rubber, (b) platinum catalyzed crumb rubber made with solvent added, and (c) self-catalyzed crumb rubber made with solvent added.

The silicon-modified crumb rubber is readily obtained through the reaction between the unsaturation in the crumb rubber and a Silicon hydride of the formula:

$$R_xSi_yH_z$$

wherein R is selected from the group consisting of a monovalent hydrocarbon radicals from C1 to C20, including alkyl radicals, straight chain or branched, C3 to C6 cycloalkyl radicals, aryl radicals such as phenyl, and alkaryl radicals such as tolyl; halogen atoms; —OR' radicals (alkoxy); —OCR" (carboxy); and —COOR'" radicals (ester), wherein z has a value of 1 to 3 inclusive, x has a value of 0 to 3 inclusive and y ranges from 1 to 10 and wherein if x is greater than 1, the R moieties may be the same or different.

Examples of silicon hydrides useful in this Invention are benzylsilane, ethoxydimethylsilane, propylsilane, silylbenzene, trimethoxysilane, chlorodiisoproplysilane, chlorodiphenylsilane, chloromethylphenyl silane, ethoxydimethylsilane and trichlorosilane.

More preferred, the R group is a hydrocarbon radical having 1 to 4 carbon atoms and/or a halogen such as chlorine. Examples of these silicon hydrides are propylsilane, chlorodiisopropyl silane and trichlorosilane.

The crumb rubber useful in the Invention includes any rubber having unsaturation. The rubber can be a natural or synthetic elastomer, crosslinked or network rubber, or a mixture of both. Typically a "diene" rubber is employed in the manufacture of tires. A "diene" rubber is understood to mean a rubber having at least in part (i.e., a homopolymer or a copolymer) carbon-carbon double bonds (>C=C<). Diene rubbers such as butyl rubbers or copolymers of dienes and of alpha-olefins of the EPDM type (i.e., having a low content of diene units, typically less than 15 mol %) and highly unsaturated rubbers (i.e. having a content of diene units which is greater than 15 mol %) are typically present in crumb rubber.

Although this invention applies to any type of diene rubber, the person skilled in the art will understand that the present invention is preferably used with highly unsaturated diene rubbers such as those types used in tires. Examples of such rubbers are diene rubbers selected from the group consisting of polybutadienes, polyisoprenes, natural rubber, butadiene-styrene copolymers, butadiene-isoprene copolymers, isoprene-styrene copolymers, and isoprene-butadiene-styrene copolymers and mixtures of these rubbers, before and after fully crosslinking.

Of course, since the crumb rubbers are often obtained from different types of tires and/or different locations on the tires, the vulcanized crumb rubber particle may contain a mixture of several diene rubbers, and the crumb rubbers used can have other types of polymers and elastomers present such as, for example, thermoplastic polymers, and partially crosslinked derivatives thereof.

An assortment of chemical additives is used in the manufacture of tires. Hence, tires may contain 10 to 20 or more different components made of different polymers, fillers, oils, chemical additives and cure systems. So, crumb rubber obtained from tires can contain many varied ingredients like fillers such as carbon black, silica, and clays; preservatives such as anti-ozonants and anti-oxidants; sulfur and vulcanizing agents; processing oils; etc. Therefore, the crumb rubber could have some initial silicon content from ingredients such as silica, clays, etc. which is believed not present as C—Si covalent bonds The crumb rubber per se is defined as the particles derived by reducing scrap tire or other rubber into granules with the reinforcing materials such as steel or fiber removed, along with any other contaminants such as dust, glass, or rock. The aforementioned article in *Rubber Chemistry and Technology* discloses many methods of grinding vulcanized or crosslinked rubber into crumb rubber particles. Any form of grinding is applicable. In ambient grinding, the rubber particles produced generally have a cut surface shape and are rough in texture. Cryogenic grinding typically reduces the rubber to particles ranging from about ¼ inch to 30 mesh. The resulting material appears shiny and has a clean, fractured surface. In addition to ambient grinding and cryogenic grinding, there are several wet grinding processes in use today in the U.S. for producing fine and super-fine grades of crumb rubber.

Any type of vulcanized crumb rubber particle obtained by any type of grinding method is useful in the Invention. Crumb rubber is typically sorted and graded according to its particle size and source. Crumb rubber is commercially obtainable from many sources. An article in the *Rubber and Plastics News* of Oct. 12, 1992 by authors Gerald Holland, Benfei Hu and Mark Smith describes the production and grading of crumb (ground) rubbers.

The size of the crumb rubber particle can range from about 10 millimeters to less than 0.18 millimeters in average diameter. The size is typically expressed in "mesh", which ranges from about 4 mesh to about 120 mesh or more. For most applications, a crumb rubber size of about 40 mesh to about 100 mesh is favorable.

Applicants used platinum catalysts such as Karstedt's catalyst and chloroplatinic acid [$H_2PtCl_6$] to catalyze the reaction between the crumb rubber and the Silicon hydride, and they achieved efficient reaction of the silicon hydride with the unsaturation in the crumb rubber. These reactions were conducted in situ or in a solvent for the crumb rubber such as toluene. Temperatures ranged from ambient (about 20 to 25° C.) up to 50° C. Time of reaction can be 1 hour or more. In the examples, the time was typically 12 hours to four days. After the reaction, unreacted silicon hydride was removed by extraction with chloroform followed by removal of the solvent. If a chlorine-containing silicon hydride was used, the silicon-modified crumb rubber was mixed with water to hydrolyze the Si—Cl groups and remove HCl. The silicon-modified crumb rubber was then dried for testing.

Applicants also discovered, to their surprise, that the above reaction proceeded as efficiently without the use of an added catalyst. This "self-catalyzed" reaction is believed aided by compounding ingredients such as clays which can be present in the vulcanized crumb rubber particles.

The silicon-modified crumb rubber of the Invention contains from about 0.1% up to about 10% by weight bound silicon content present as C—Si bonds, and, more preferably, from about 0.5% to about 5% by weight of silicon.

The modified crumb rubber can be used as is or mixed with other ingredients to make useful articles. For example, the silicon modified crumb can be dispersed in thermoplastics or thermoset compositions. It can also be used as aggregate in cement mixes. Typically the silicon-modified crumb is mixed with virgin rubber compositions and cured to form useful articles. The silicon modified crumb rubber can be used in up to 25% or more by weight of the rubber content. Physical properties of the cured rubber mix exhibit higher low strain modulus and similar cohesive properties when using an equal amount of the untreated crumb rubber. This indicates that the silicon-modified crumb rubber is acting like a reinforcing filler and has increased interaction with the matrix. Applications for the silicon-modified crumb rubber are the same as for the virgin compositions; i.e. to prepare rubber such as formed articles, mats, hoses, shoe soles, gaskets, tires and the like.

The invention is further illustrated by the following non-limiting examples.

EXAMPLES

Materials: Trichlorosilane (Alfa Aesar), chloroplatinic acid [$H_2PtCl_6$], Karstedt's catalyst (Gelest Laboratories) and whole-tire crumb rubber (Rouse Rubber) having an 80 mesh were used as received.

Instrumentation:

IR spectra were obtained on a Nicolet IR microscope, equipped with a liquid nitrogen cooled MCT detector, connected to a Nicolet Magna 550 spectrophotometer. IR spectrum of rubber was obtained by rolling fine particles of the rubber on a KBr microscope slide. Solid-state $^{13}C$ and $^{29}Si$ NMR measurements were performed on a Bruker DSX-300 spectrometer in a Bruker double-resonance MAS probehead. For $^{13}C$ NMR, standard direct-polarization (DP) measurements were performed using a pulse recycle delay=5 s, ns=2 k, contact time=1 ms, spin=5 kHz were employed. For $^{29}Si$ NMR, standard cross-polarization (CP) measurements were performed using a pulse recycle delay=5 s, ns=4 k, contact time=5 ms, spin=5 kHz were employed. Elemental silicon analysis was performed at Robertson Microlit Laboratories in Madison, N.J. using a Perkin Elmer 3000 DV instrument.

Example 1

This example shows the preparation of a silicon-modified crumb rubber in a solvent with and without an added catalyst.

(A) Platinum Catalyzed Reaction.

A four neck reactor was fitted with mechanical stirrer, a $N_2$ inlet, and a thermocouple. The flame dried reactor was purged with $N_2$ for 30 minutes and to the flask was added pre-dried, 200 g of crumb rubber, 2.5 L of toluene and platinum catalyst, (1 mL of Karstedt's catalyst (2.1-2.4% platinum concentration in xylene) [1,3-divinyltetramethyldisiloxane-Pt complex] or 1.3 g (0.0031 mol) of chloroplatinic acid in 10 mL isopropanol. The mixture was stirred for 30 minutes and 100 g (0.738 mol) of trichlorosilane was added as one portion. The reaction proceeded at 45° C. for 4 days and toluene was distilled off at 80° C. using a short path distillation apparatus. After removal of the toluene, 2.5 L chloroform was added to the reactor and stirred for 1 hour to extract all unreacted chlorosilane. The chloroform was removed at 45° C. using a short path distillation apparatus. Water (2.5 L) was added and the mixture was stirred for 1 hour. The modified rubber was isolated by filtration and dried under air for 48 hours and heated for 4 to 8 hours at 80° C. under vacuum.

(B) Self-Catalyzed Reaction.

The above experiment was repeated except no catalyst was added. A four neck reactor was fitted with mechanical stirrer, a $N_2$ inlet, and a thermocouple. The flame dried reactor was purged with $N_2$ for 30 minutes and to the flask were added pre-dried, 200 g of crumb rubber and 2.5 L of toluene. The mixture was stirred for 30 minutes and 100 g (0.738 mol) of trichlorosilane was added as one portion. The reaction proceeded at 45° C. for 4 days and toluene was distilled off at 80° C. using a short path distillation apparatus. After removal of the toluene, 2.5 L chloroform was added to the reactor and stirred for 1 hour to extract all unreacted chlorosilane. The chloroform was removed at 45° C. using a short path distillation apparatus. Water (2.5 L) was added and the mixture was stirred for 1 hour. The modified rubber was isolated by filtration and dried under air for 48 hours and heated for 4 to 8 hours at 80° C. under vacuum.

The products were characterized by solid state $^{13}C$ NMR (DP MAS) and $^{29}Si$ NMR (CP MAS) techniques. The chemical shifts for the polymer were determined by solid state $^{13}C$ NMR as 124.3, 128.6 and 133.0 ppm (FIG. 1). Hydrosilation of the polymer resulted in the disappearance of the peaks at 133.9 and 124.3 ppm and the formation of broad new peaks at 26, 30 and 37 ppm. This data confirms formation of new $sp^3$ hybridized carbon atoms. The chemical shift at 128.6 ppm remains unchanged indicating the presence of styrene in the crumb rubber.

Figure 2:
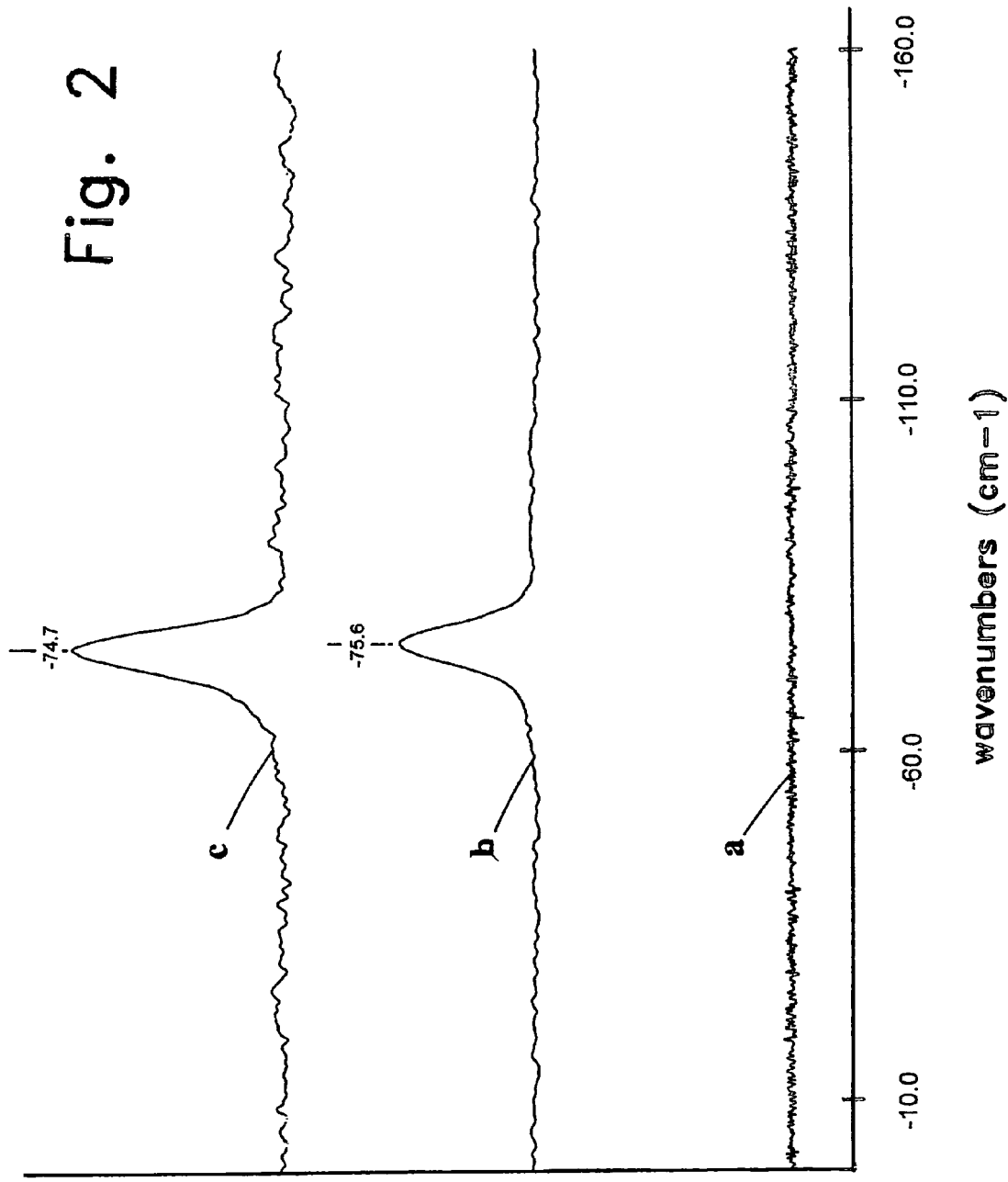
FIG. 2: $^{29}$Si NMR (CP MAS), spectra overlay of (a) unreacted crumb tire rubber, (b) platinum catalyzed crumb rubber and (c) self-catalyzed crumb rubber samples.

Functionalized and unreacted crumb rubber were analyzed by solid $^{29}Si$ NMR and the functionalized crumb rubber exhibited a chemical shift at −74.7 ppm (FIG. 2). The chemical shift is within the range of literature values for similar types of compounds. The new signals in the solid state $^{29}Si$ NMR spectra confirm the formation of new C—Si bonds (ca. −75 ppm).

Figure 3:
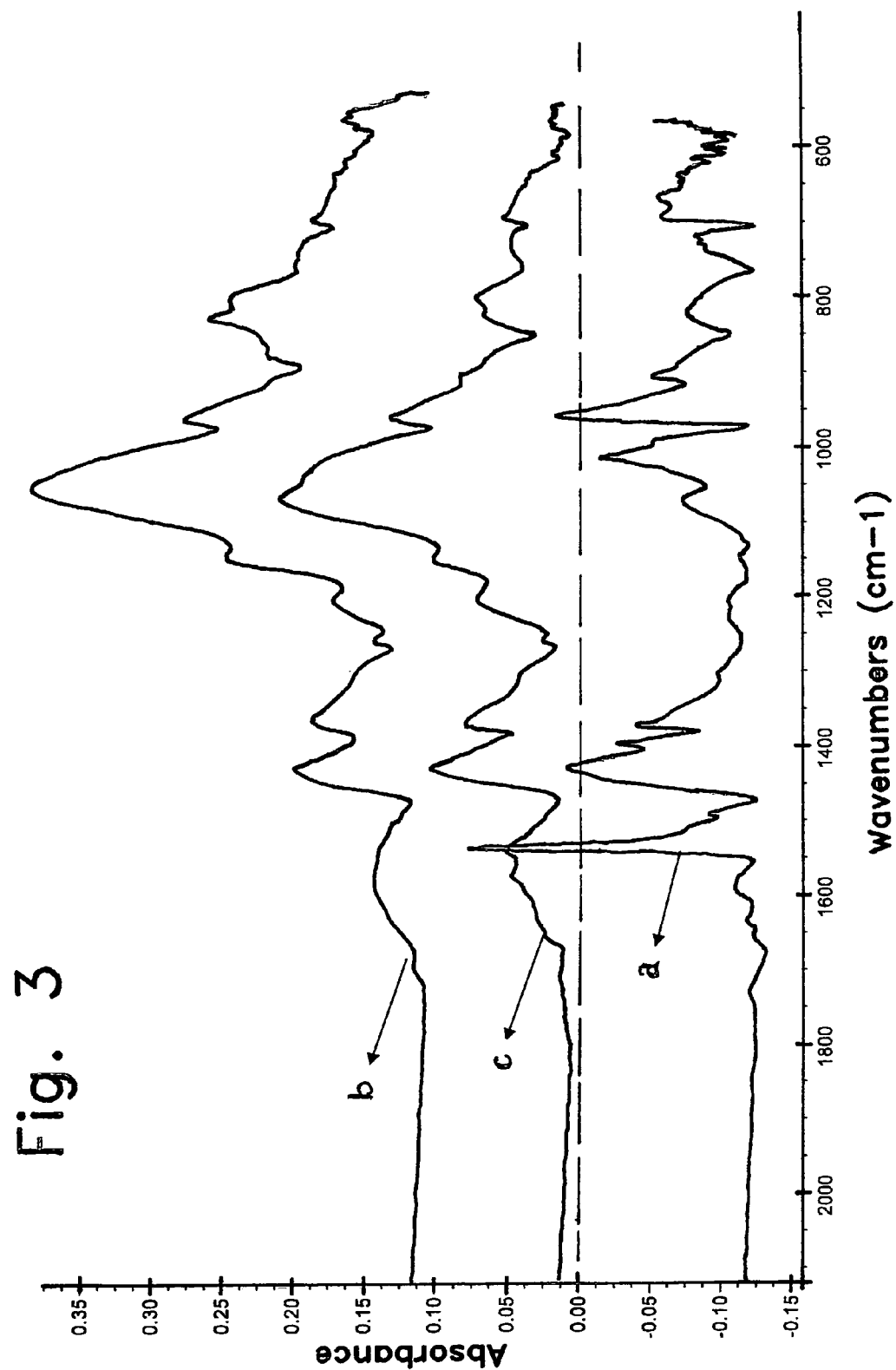
FIG. 3: IR spectrum overlay of (a) unreacted crumb tire rubber, (b) platinum catalyzed crumb rubber and (c) self-catalyzed crumb rubber.
Figure 4:
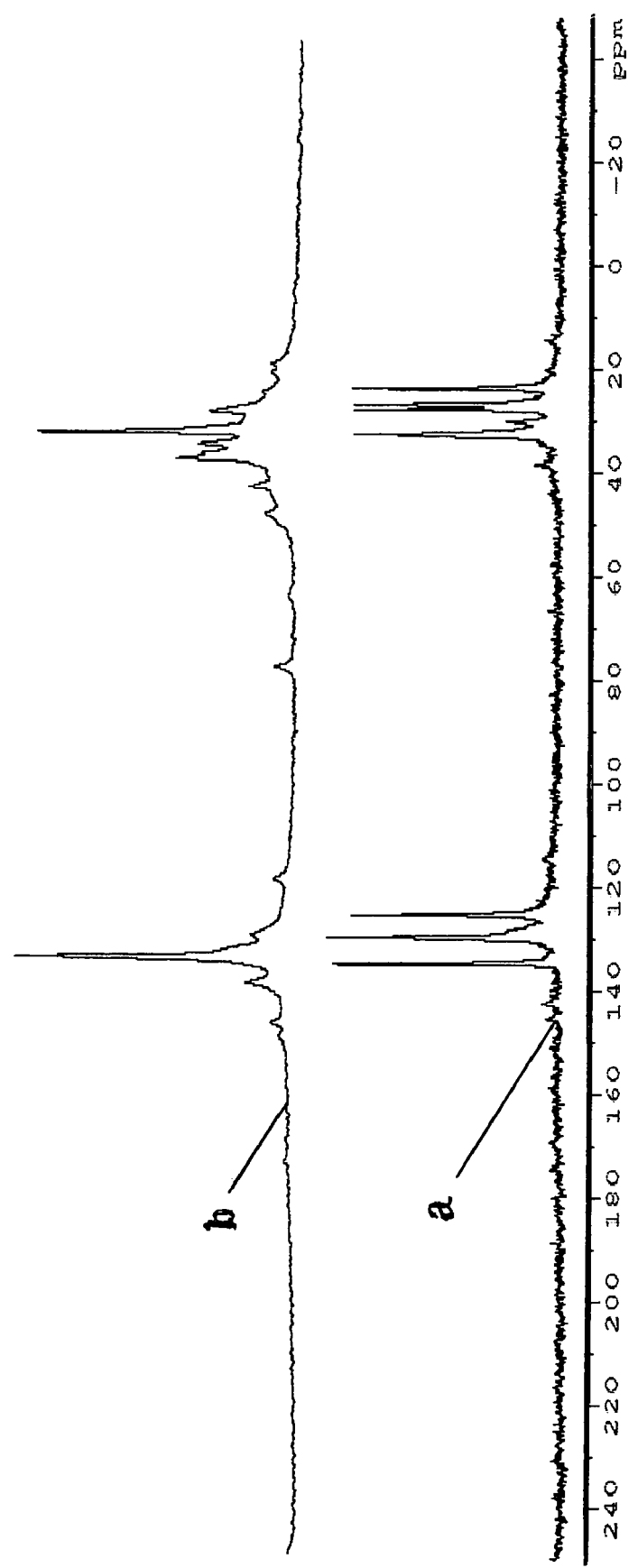
FIG. 4: $^{13}$C NMR (DP MAS) overlay of (a) unreacted crumb tire rubber and (b) platinum catalyzed crumb rubber made with no solvent added.

Elemental analyses for the modified and unreacted crumb rubber were conducted and compared (Table 1). Elemental analysis data indicates a silicon content of 4.3 wt. % Si using a $H_2PtCl_6$ catalyst and 4.1 wt. % Si using Karstedt's catalyst, whereas the unreacted crumb rubber control contained a silicon content of 0.81 wt. %. The self-catalyzed crumb rubber sample had a silicon content of 9.0 wt. %. The modified and unreacted crumb rubber samples were characterized by IR (ATR) spectroscopy. New peaks were observed for well washed modified crumb rubber at 1020-1100, 820-900 and 1000-1100 $cm^{-1}$ indicating the formation of new Si—O—Si, Si—OH bonds, respectively (FIG. 3). All the data obtained by solid state $^{13}C$ and $^{29}Si$ NMR, IR (ATR) elemental analysis and macro-ash, confirmed the formation of C—Si bonding between the vulcanized crumb rubber particles and the trichlorosilane. The macro-ash is obtained according to ASTM D297-35 with the exception that the furnace is maintained at 800° C.

The elemental analysis and % macro-ash contents are summarized in Table 1 below.

TABLE 1

| Sample Name | Si wt. % | % Macro-ash by Weight |
|---|---|---|
| Unreacted Crumb Rubber | 0.8 | 7.6 |
| Platinum catalyzed ($H_2PtCl_6$) | 4.3 | 12.5 |
| Platinum catalyzed (Karstedt's) | 4.1 | 11.9 |
| Self-catalyzed | 9.0 | 28.5 |

Example 2

The reaction described in Example 1 above was essentially repeated except that the time period for the reaction was one day. The silicon content of the modified crumb rubber prepared using Karstedt's catalyst was 4.0 wt % (with a macro-ash wt % of 19.5 wt %), and the silicon content of the crumb rubber prepared in the self-catalyzed reaction was 3.4 wt % (with a macro-ash content of 12.5%).

Example 3

This example shows the preparation of a silicon-modified crumb rubber using a catalyst in a solvent a various levels of the silicon hydride.

The reaction in Example 2 above for the platinum catalyzed reaction was essentially repeated, except that the concentration of the trichlorosilane was 5 wt %, 12.5 wt % and 50 wt %. For 5 wt %, the silicon content of the modified crumb rubber prepared was 1.7 wt % (and the macro-ash content was 6.0 wt %). For 12.5 wt %, the silicon content of the modified crumb rubber prepared was 2.6 wt % (and the macro-ash content was 8.1 wt %). For 50 wt %, the silicon content of the modified crumb rubber prepared was 3.3 wt % (and the macro-ash content was 10.2 wt %).

Example 4

This example shows the reaction between the crumb rubber and the silicon hydride with and without a catalyst, but using no solvent.

A) Platinum Catalyzed Reaction Without Adding Solvent

A three neck reactor was fitted with a mechanical stirrer, a $N_2$ inlet, and a thermocouple. The flame dried reactor was purged with $N_2$ for 30 minutes, and to the flask was added pre-dried, 20 grams of crumb rubber and a platinum catalyst, (0.1 mL of Karstedt's catalyst (2.1-2.4% platinum concentration in xylene)) [1,3-divinyltetramethyldisiloxane-Pt complex]. The mixture was stirred for 30 minutes and 10 grams (0.0738 mol) of trichlorosilane was added as one portion. The reaction proceeded at 45° C. for 1 day. After the reaction, 250 mL of chloroform was added to the reactor and stirred for 1 hour to extract all unreacted chlorosilane. The chloroform was removed at 45° C. using a short path distillation apparatus. Water (250 mL) was added and the mixture was stirred for 1 hour. The modified rubber was isolated by filtration and dried under air for 48 hours and heated for 4 to 8 hours at 80° C. under vacuum.

B) Self-Catalyzed Reaction Without Adding Solvent

The reaction in Example 4A above was repeated except no catalyst was added. A three neck reactor was fitted with a mechanical stirrer, a N2 inlet, and a thermocouple. The flame dried reactor was purged with $N_2$ for 30 minutes, and to the flask were added pre-dried and 20 grams of crumb rubber. The mixture was stirred for 30 minutes and 10 grams (0.0738 mol) of trichlorosilane was added as one portion. The reaction proceeded at 45° C. for 1 day. After the reaction, 250 mL of chloroform was added to the reactor and stirred for 1 hour to extract all unreacted chlorosilane. The chloroform was removed at 45° C. using a short path distillation apparatus. Water (250 mL) was added and the mixture was stirred for 1 hour. The modified rubber was isolated by filtration and dried under air for 48 hours and heated for 4 to 8 hours at 80° C. under vacuum.

The following Table 2 summarizes the analysis of unreacted crumb rubber, platinum-catalyzed crumb rubber and self-catalyzed crumb rubbers prepared under the different conditions in Examples 1 to 4 above. The results show that the self-catalyzed reaction occurred as efficiently as the catalyzed reactions under the conditions, and that the reaction occurs readily without the use of an added solvent.

TABLE 2

Summary of Modified Crumb Rubber Results

| Sample | Description | Si wt % | % Macro-ash by Weight |
|---|---|---|---|
| | [All at 50 wt % TCS] | | |
| Control | Unreacted Crumb Rubber | 0.8 | 7.6 |
| Ex. 1 A1 | $H_2PtCl_6$, 4 days | 4.3 | 12.5 |
| Ex. 1 A2 | Karstedt's, 4 days | 4.1 | 11.9 |
| Ex. 1 B | Self-catalyzed, 4 days | 9.0 | 28.5 |
| | [All at 50 wt % TCS] | | |
| Ex. 2 | Self-catalyzed, 1 day | 3.4 | 12.5 |
| | Karstedt's, 1 day | 4.0 | 19.5 |
| | [All 1 day, Karstedt's] | | |
| Ex. 3 | 5 wt % TCS | 1.7 | 6.0 |
| | 12.5 wt % TCS | 2.6 | 8.1 |
| | 50 wt % TCS | 3.3 | 10.2 |
| | [All 1 day, 50 wt % TCS, without solvent] | | |
| Ex. 4 | Karstedt's | 4.2 | 9.5 |
| | Self-catalyzed | 3.0 | 9.3 |

Example 5

This example shows that the use of the silicon-modified crumb rubber in virgin rubber formulations gives better physical properties that using the untreated crumb rubber.

Rubber mix formulations were made according to the present Invention. Conventional 1 stage mixing techniques were used. A 440 mL internal mixer and a 2 roll mill were used in carrying out the mixing. The mixed compositions were evaluated for their cure time and cure state using a rheometer. The mix formulations studied are shown below in Table 3 in parts per hundred rubber. SBR is a non oil-extended solution SBR with a Tg of −25 C and Mooney viscosity of 55 MU; N330 is a reinforcing carbon black; TESPT is bis-(3-triethoxysilylpropyl)-tetrasulfane, a coupling agent; 6 PPD is a paraphenyldiamine antioxidant and antiozonant; S is sulfur; CBS is a sulfenamide based accelerator; ZnO is zinc oxide and SAD is stearic acid, both are curing activators.

TABLE 3

| | | Mix Number | | | | | | | |
|---|---|---|---|---|---|---|---|---|---|
| | | 1 | 2 | 3 | 4 | 5 | 6 | 7 | 8 |
| | | Control | | | | | | | |
| SBR | | 100.00 | 100.00 | 100.00 | 100.00 | 100.00 | 100.00 | 100.00 | 100.00 |
| N330 | | 50.00 | 50.00 | 50.00 | 50.00 | 50.00 | 50.00 | 50.00 | 50.00 |
| SAD | | 1.00 | 1.00 | 1.00 | 1.00 | 1.00 | 1.00 | 1.00 | 1.00 |
| 6PPD | | 1.50 | 1.50 | 1.50 | 1.50 | 1.50 | 1.50 | 1.50 | 1.50 |
| ZnO | | 2.50 | 2.50 | 2.50 | 2.50 | 2.50 | 2.50 | 2.50 | 2.50 |
| TESPT | | | | | 3.00 | | | 3.00 | |
| Ex. 1A1 | $H_2PtCl_6$ | | | | | 18.00 | 40.00 | 40.00 | |
| Ex. 1B | Self Catalyzed | | | | | | | | 18.00 |
| Crumb Rubber | Unmodified | | 18.00 | 40.00 | 40.00 | | | | |
| S | | 1.20 | 1.20 | 1.20 | 0.90 | 1.20 | 1.20 | 0.90 | 1.20 |
| CBS | | 1.20 | 1.20 | 1.20 | 1.20 | 1.20 | 1.20 | 1.20 | 1.20 |

The cured properties are summarized in Table 4 shown below. The curing characteristics (time to 50% and 95% cure) were measured according to ASTM D5289. The modulus and tensile strength were measured according to ASTM D412, Test Method A. The only difference for measuring modulus versus ASTM D412, Test Method A, was that the samples were cycled 2 times to the given elongation before measuring the modulus level at 100% and 300%. The shore hardness was measured according to ASTM D2240, with a device whose name is "Durometer of type A." The variable strain dynamic properties were measured in shear on a MTS dynamic tester at 25° C. and 10 Hz. Mix #1 is a control compound.

TABLE 4

|  | Mix Number | | | | | | | |
| --- | --- | --- | --- | --- | --- | --- | --- | --- |
|  | 1 | 2 | 3 | 4 | 5 | 6 | 7 | 8 |
| Cure Time at 150° C., minutes | 40 | 40 | 40 | 70 | 90 | 90 | 90 | 90 |
| Time to 50% cure, minutes at 150° C. | 10.5 | 9.1 | 8.1 | 11.3 | 19.4 | 14.9 | 11.2 | 19.7 |
| Time to 95% cure, minutes at 150° C. | 22 | 23 | 27 | 50 | 53 | 52 | 51 | 74 |
| Cured Properties | | | | | | | | |
| Modulus at 100% strain, MPa | 2.42 | 2.12 | 1.86 | 1.84 | 4.03 | 3.78 | 4.85 | 3.22 |
| Modulus at 300% strain, MPa | 2.88 | 2.15 | 1.67 | 1.66 | 3.07 |  |  | 2.53 |
| Shore A Hardness | 68 | 67 | 67 | 67 | 78 | 82 | 83 | 74 |
| Tensile Strength at 25° C. | | | | | | | | |
| Stress at break, N/mm2 | 22.3 | 16.5 | 15.1 | 15.1 | 13.6 | 7.7 | 11.3 | 13.8 |
| Strain at break, % | 413 | 398 | 450 | 449 | 262 | 186 | 196 | 322 |
| Variable Strain Dynamic Properties at 25° C., 10 Hz | | | | | | | | |
| Tan delta at 5% strain | 0.27 | 0.26 | 0.26 | 0.25 | 0.27 | 0.27 | 0.26 | 0.27 |
| G* at 5% strain (MPa) | 2.60 | 2.61 | 2.59 | 2.37 | 3.35 | 3.92 | 4.10 | 2.90 |

As can be observed, the mixes containing unreacted crumb rubber (mixes # 2-4), showed deterioration in rupture properties while maintaining a low strain modulus level. The drop in the high strain modulus is likely due to lower crosslink density in the matrix and the likely low interaction between the virgin compound and the unreacted crumb rubber. The decrease in rupture properties is caused by this crosslink density factor, the particles creating additional initiation sites and possibly poor interfacial properties. At 5% deformation, the hysteresis (tan delta at 5% strain) is the same as the witness due to maintaining a similar modulus.

The room temperatures properties for the silicon-modified crumb rubber (mixes # 5 and 6) show a significant enhancement in low strain modulus. The rupture properties are decreased more than for the unreacted crumb rubber. However, this trend is expected due to the enhancement of modulus and the traditional increased filler effect on cohesive properties once the optimal filler loading is passed. The addition of TESPT (mix # 7 versus mix # 6) does significantly improve the stress at break which indicates a stronger interaction between the silicon-modified crumb rubber and elastomer, as is seen with the addition of TESPT to mixes containing precipitated silica (as described in an article in Rubber Chemistry and Technology, Vol. 69, 1996 by Siegfried Wolf entitled "Chemical Aspects of Rubber Reinforcement by Fillers, pages 328-344). This improvement in cohesive properties is not seen with the untreated crumb rubber (mix # 3 versus mix # 4). The addition of self catalyzed crumb rubber (mix # 8) gives a similar trend in properties to platinum catalyzed silicon modified crumb rubber (mix # 5).

We claim:

1. An organosilicon composition containing from about 0.1% to about 10% by weight bound silicon present as C—Si bonds, wherein a carbon to silicon covalent bond was created by a reaction between an unsaturation in a crumb rubber particle and a silicon hydride having the formula: $R_xSi_yH_z$ wherein R is selected from the group consisting of (a) monovalent hydrocarbon radicals or substituted hydrocarbon radicals from C1 to C20, including hydrocarbon radicals and substituents such as alkyl radicals, straight chain or branched, C3 to C6 cycloalkyl radicals, aryl radicals, and alkaryl radicals; (b) halogen atoms; (c) alkoxy radicals; (d) carboxy radicals; and (e) ester radicals; and wherein z has a value of 1 to 3; x has a value of 0 to 3; and y ranges from 1 to 10; and further, if x is greater than 1, the R moieties may be the same or different; and the reaction occurs with no added catalyst.

2. The composition of claim 1, wherein the crumb rubber particle comprises a dienic rubber.

3. The composition of claim 2, wherein the dienic rubber is selected from the group consisting of polybutadienes, polyisoprenes, natural rubber, butadiene-styrene copolymers, butadiene-isoprene copolymers, isoprene-styrene copolymers, isoprene-butadiene-styrene copolymers, isobutylene-isoprene copolymers, crosslinked derivatives thereof, and mixtures thereof.

4. The composition of claim 1, wherein the silicon content is from about 0.5% to about 5% by weight bound silicon present as C—Si bonds.

5. The composition of claim 1, wherein the silicon hydride is trichlorosilane.

6. A cured article comprising an organosilicon composition containing from about 0.1% to about 10% by weight bound silicon present as C—Si bonds, wherein a carbon to silicon covalent bond was created by a reaction between an unsaturation in a crumb rubber particle and a silicon hydride having the formula: $R_xSi_yH_z$, wherein R is selected from the group consisting of (a) monovalent hydrocarbon radicals or substituted hydrocarbon radicals from C1 to C20, including hydrocarbon radicals and substituents such as alkyl radicals, straight chain or branched, C3 to C6 cycloalkyl radicals, aryl radicals, and alkaryl radicals; (b) halogen atoms; (c) alkoxy radicals; (d) carboxy radicals; and (e) ester radicals; and wherein z has a value of 1 to 3; x has a value of 0 to 3; and y ranges from 1 to 10; and further, if x is greater than 1, the R moieties may be the same or different.

7. The article of claim 6, wherein the article further comprises a rubber compound, the rubber compound in a mixture with the composition of claim 6.

8. The article of claim 7, wherein the mixture comprises the composition of claim 7 in an amount of up to 25% by weight of the total rubber content in the mixture.

9. The article of claim 7, wherein the article is a tire.

10. The article of claim 6, wherein the silicon content is from about 0.5% to about 5% by weight bound silicon present as C—Si bonds.

11. The composition of claim 6, wherein the silicon hydride is trichiorosilane.

* * * * *